(12) United States Patent
Shim

(10) Patent No.: US 6,309,322 B1
(45) Date of Patent: Oct. 30, 2001

(54) POWER TRAIN OF AUTOMATIC TRANSMISSION

(75) Inventor: Hyu-Tae Shim, Kyunggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,798

(22) Filed: Dec. 29, 1999

(30) Foreign Application Priority Data

Oct. 29, 1999 (KR) ................................................ 99-47432

(51) Int. Cl.$^7$ ....................................................... F16H 3/44
(52) U.S. Cl. ........................... 475/269; 475/281; 475/283
(58) Field of Search ................................... 475/269, 281, 475/900, 275, 282, 283, 271, 276

(56) References Cited

U.S. PATENT DOCUMENTS

| | | | |
|---|---|---|---|
| 5,735,376 | * | 4/1998 | Moroto et al. ................. 192/85 CA |
| 5,853,344 | * | 12/1998 | Tsukamoto et al. ................. 475/269 |
| 5,951,433 | * | 9/1999 | Tsukamoto et al. ................. 475/281 |

* cited by examiner

Primary Examiner—Sherry Estremsky
Assistant Examiner—Tisha D. Lewis
(74) Attorney, Agent, or Firm—Birch, Stewart, Kolasch & Birch, LLP

(57) ABSTRACT

A power train of automatic transmission constructed to arrange a transfer drive gear and an over drive clutch before a planetary gear set and to arrange an under drive clutch, an reverse clutch second speed brake, a low reverse brake, one-way clutch low, while a double pinion planetary gear set is assembled to an input shaft receiving a rotating power from engine for rotation to thereby embody a speed shift of four advance speeds and one reverse speed, the power train comprising: an under drive clutch connected to a rear of under drive sun gear via a first power transmission member; a reverse clutch connected to a rear of reverse sun gear via a second power transmission member; a second speed brake mounted at a transmission house for restraining rotation of the second power transmission member; a one-way clutch connected to a rear of long pinion via a third power transmission member and disposed at the transmission housing: a low reverse brake branched from the third power transmission member to be connected to the transmission housing; an over drive clutch for variably connecting an input axle to a planetary carrier; and a transfer drive gear connected to a front of annulus gear via a bearing.

7 Claims, 8 Drawing Sheets

FIG. 5

| SHIFT STAGE | C1 (UNDER DRIVE CLUTCH) | C2 (REVERSE CLUTCH) | C3 (OVER DRIVE CLUTCH) | B1 (SECOND SPEED BRAKE) | B2 (LOW REVERSE BRAKE) | OWC (ONE WAY CLUTCH) | REMARK |
|---|---|---|---|---|---|---|---|
| FIRST SPEED | O | | | | | O | |
| SECOND SPEED | O | | | O | | | |
| THIRD SPEED | O | | O | | | | |
| FOURTH SPEED | | | O | O | | | |
| REVERSE | | O | | | O | | |

POWER TRAIN OF AUTOMATIC TRANSMISSION

BACKGROUND OF THE INVENTION

1. Field of the Invention

The present invention relates to a power train of automatic transmission, and more particularly to a power train of automatic transmission adapted to arrange an under drive clutch, a reverse clutch and a kickdown brake behind a planetary gear set and to provide an over drive clutch and a transfer driver gear in front of the planetary gear set.

2. Description of the Prior Art

FIG. 6 is a schematic diagram for illustrating a power train according to the prior art. The power train of automatic transmission is arranged in front of a planetary gear set 2 with a front clutch 8 connected to a reverse sun gear 6 by a first power transmission member 4, a rear clutch 14 connected to a forward sun gear 12 by a second power transmission member 10, a kickdown band brake 16 controlling a rotary power of the first power transmission member 4 and a low reverse brake 24 connected to a transmission housing 22 for controlling a one-way clutch 20 connected to a long pinion 17 and a third power transmission member 18 and is provided at a rear end thereof with a transfer drive gear 30 meshed with a transfer driven gear 28 by being connected to an annulus gear 26 and an end clutch 34 connected to a planetary carrier 32.

The transfer driven gear 28 is connected by a transfer shaft 36 and a deep drive gear 38.

FIG. 7 is a schematic diagram for illustrating a final reduction gear unit applied to a power train of automatic transmission according to the prior art.

In the final reduction gear unit 44, an input from an input shaft 40 is transmitted to a transfer drive gear 30 via planetary gear set 2, and the power transmitted thereby is transmitted to wheels via the transfer driven gear 28 meshed with the transfer shaft 36 and the deep drive gear 38.

The transfer drive gear 30 is connected to an annulus gear 26 of the planetary gear set 2 via a clocking nut 46 to be mounted at an output flange 48.

The transfer drive gear 30 is rotably supported by double angular bearing 54 fixed by a bolt 52 to the transmission housing 22. The transfer driven gear 28 meshed with the transfer drive gear 30 is also secured to the transfer shaft 36 by a locking nut 56.

FIG. 8 is a schematic diagram for illustrating an end clutch unit according to the prior art, where the end clutch unit 34 is arranged at an end clutch shaft 58 of input shaft 40 with an end clutch hub 60, at the input shaft 40 with an end clutch retainer 62, and there between with a clutch reaction plate 64, clutch plate 66 and a clutch disc 68, and includes an end clutch piston 70 disposed in front of the end clutch retainer 62 and an end clutch return spring 72 supporting the end clutch piston 70.

The end clutch unit 34 is clutched when oil pressure is applied through an oil orifice 74 provided at the end clutch retainer 62 while the end clutch piston 70 copes with the resilience of the end clutch return spring 72 to press the clutch plate 66 and clutch disc 68.

Conversely, when oil pressure applied to the end clutch unit 34 is released, the end clutch piston 70 is retracted by the end clutch return spring 72 to separate the clutch plate 66 and the clutch disc 68, thereby blocking the power transmission.

FIG. 9 is a schematic diagram for illustrating front and rear clutch intermittent controller of automatic transmission according to the prior art, where the front and rear clutch intermittent controller 80 includes at front side of the planetary gear set 2 a kickdown band brake 16, front clutch 8 and a rear clutch 14.

The kickdown band brake 16 is arranged at a peripheral surface of kickdown drum 82. The rear clutch 14 includes a clutch reaction plate 88 and a clutch disc 90 and a clutch plate 92 between rear clutch retainer 84 disposed at the input shaft 40 and rear clutch hub 86 connected to the forward sun gear 12.

Furthermore, the rear clutch 14 is also provided with a rear clutch piston 98 which copes with resilience of the rear clutch return spring 96 supported by rear clutch return spring retainer 94, advances by way of pressure of supplied oil and presses the clutch disc 90 and clutch plate 92 to interrupt the power.

Front clutch 8 includes a front clutch reaction plate 104 disposed between front clutch hub 100 formed at rear clutch retainer 84 and front clutch retainer 84, a clutch disc 106, a clutch plate 108 and a front clutch piston 112 for coping with the resilient of front clutch return spring 110 to advance by way of oil pressure.

Now, operation of rear clutch at the front and rear clutch intermittent controller 80 thus described will be described.

When pressure is applied through an oil orifice 114 formed at the rear clutch retainer 84, the rear clutch piston 98 copes with the resilience and advances to press the clutch disc 90 and the clutch plate 92 for integration and power transfer.

Furthermore, when the oil pressure is applied to the front clutch 8, the clutch disc 106 and the clutch plate 108 are integrated by the front clutch piston 112 to transfer the power to the front clutch retainer 102.

The power transferred is transmitted to the reverse sun gear 6 via the kickdown drum 82 and to transfer drive gear via the long pinion 17, annulus gear 26 and the like by way of planet carrier 118 fixed by low reverse brake 116 as repulsive element.

Now, transmission action of the power train at the automatic transmission will be described.

<First speed>

The rear clutch 14 as input element and one-way clutch 20 as repulsive element operate to form a first speed of drive "D" range.

The power input to the input shaft 40 is transmitted to the forward sun gear 12 via the rear clutch 14 and again transmitted to transfer drive gear 30 through short pinion 42, long pinion 17 and the annulus gear 26 with the planetary carrier 32 secured to the one-way clutch 20 as repulsive faction.

<Second speed> the rear clutch 14 as input element and kickdown band brake 16 as repulsive element are operated to form a second speed of drive "D" range. The power input to the input shaft 40 is transmitted to the forward sun gear 12 via the rear clutch 14 and is again transmitted to the transfer drive gear 30 through the short pinion 42, long pinion 17 and annulus gear 26 with the reverse gear 6 secured by the kickdown band brake 16 as repulsive factor.

<Third speed>

The rear clutch 14 as input element and front clutch 8 as repulsive element are operated to cause the planetary gear set 2 to integrally rotate and to perform a third speed of drive "D" range.

The power input to the input shaft 40 is transmitted simultaneously to the rear clutch 14 and the front clutch 8 and the power transmitted to the rear clutch 14 is transmitted to the forward sun gear 12 and the power transmitted to the front clutch 8 is transferred to the reverse sun gear 6. At this time, the planetary gear set 2 is locked to be integrally rotated while the power therefrom is transmitted to transfer drive gear 30.

<Fourth speed>

The end clutch 34 as input element and kickdown band brake 16 as repulsive element are operated to form a fourth speed of drive "D" range. The power input to the input shaft 40 is transmitted to the planetary carrier 32 through end clutch 34 and is again transmitted to the transfer drive gear 30 via long pinion 17, annulus gear 26 with the reverse sun gear 6 secured by the kickdown band brake 16 as repulsive factor.

<Reverse>

The front clutch 8 as input element and planetary carrier 32 secured by the lower reverse brake 24 as repulsive element are operated to cause the power to be transmitted to the transfer drive gear 30 via the long pinion 27 and the annulus gear 26.

SUMMARY OF THE INVENTION

However, there is a problem in the prior art thus described in that the transfer drive gear is arranged behind the planetary gear set to increase the length of the transfer shaft, thereby increasing weight and cost.

There is another problem in that control side of second speed brake which is a band type is inferior to that of disc type. There is still another problem in that the end clutch hub and planetary carrier are connected by end clutch shaft, thereby increasing the number of part, weight and cost. There is a further problem in that processing method (processing after sintering) of the clutch retainer and the like are inferior in terms of strength and processing efficiency.

There is still further problem in that a bearing is inserted into the transfer drive gear and a bolt is used to secure the transmission housing, such that processing and assembling efficiency are inferior and structure thereof is complicated, thereby increasing weight and cost thereof.

There is still further problem in that the end clutch hub and planetary carrier are connected by end clutch shaft, making structure complicated and therefore increasing weight and cost according to unfavorable assembly efficiency.

There is still further problem in that the end clutch piston is returned only by resilience of spring, causing a control stability to be inferior.

There is still further problem in that strength of processing method (sintering) of end clutch retainer, and processing capability thereof are inferior.

There is still further problem in that the rear clutch retainer and front clutch retainer are separately positioned to increase weight and cost.

There is still further problem in that the front clutch is not applied with a retainer such as rear clutch return spring retainer at rear clutch functioning as control balance causing a control instability.

The present invention is disclosed to solve the aforementioned problems and it is an object of the present invention to provide a power train of automatic transmission.

In accordance with one object of the present invention, there is provided a power train of automatic transmission constructed and arranged to mount a transfer drive gear and an over drive clutch in front of a planetary gear set and to provide an under drive clutch, reverse clutch second speed brake, low reverse brake and one-way clutch at a rear side thereof, thereby reducing the number of parts and weight.

In accordance with another object of the present invention, there is provided a power train of automatic transmission constructed and configured to improve arrangement of transfer drive gear and the like for shortening the length of a transfer shaft, thereby improving processing ability and assembly efficiency and reducing the number of parts.

It is still another object of the present invention to provide a power train of automatic transmission constructed to arrange in front of a planetary gear set an over drive clutch integrating a planetary carrier with end clutch hub and shaft for simplicity of structure and to change the processing method of clutch retainer with structure of weight and cost reduction, thereby improving processibility and strength.

It is still another object of the present invention to provide a power train of automatic transmission constructed to adopt a reverse clutch retainer which integrates a rear clutch and a front clutch retainer for common use to arrange same behind a planetary gear set, thereby simplifying structure and allowing action of under drive clutch return spring retainer to both front and rear clutches for improvement of control stability, and changing a second speed brake to a disc type for easy control of reverse clutch and the like.

In accordance with one object of the present invention, there is provided a power train of automatic transmission constructed and arranged to assemble a double pinion planetary gear set to an input shaft receiving a rotating power from engine for rotation to thereby embody a speed shift of four advance speeds and one reverse speed, the power train comprising:

an under drive clutch connected to a rear of under drive sun gear via a first power transmission member;

a reverse clutch connected to a rear of reverse sun gear via a second power transmission member;

a second speed brake mounted at a transmission housing for restraining rotation of the second power transmission member;

a one-way clutch connected to a rear of long pinion via a third power transmission member and disposed at the transmission housing:

a low reverse brake branched from the third power transmission member to be connected to the transmission housing;

an over drive clutch for variably connecting an input axle to a planetary carrier; and a transfer drive gear connected to a front of annulus gear via a bearing.

In accordance with another object of the present invention, there is provided a power train of automatic transmission, the power train comprising:

a tube portion extensively formed at a transmission housing between the planetary gear set and an oil pump to pierce the input shaft;

a bearing member assembled to a peripheral surface of the tube portion so as not to be detached by a locking nut assembled to the input shaft which is an inner circumferential surface of the tube portion;

a transfer drive gear secured to the bearing member by a snap ring;

a transfer driven gear mounted by a snap ring in order to receive power by being meshed with the transfer drive gear; and a transfer shaft for mounting the transfer driven gear and for arranging a deep drive gear at one side thereof in short length to transfer power.

In accordance with still another object of the present invention, there is provided a power train of automatic transmission, the power train comprising:

an over drive clutch retainer mounted on the input shaft in front of the planetary gear set;

an over drive clutch hub integrally formed at the planetary carrier; and an over drive clutch piston so mounted as to be guided and supported by a support plate for advancing and pressing by oil pressure a clutch disc and a clutch plate arranged at one side of a clutch reaction plate provided between the over drive clutch retainer and an end clutch hub.

In accordance with still another object of the present invention, there is provided a power train of automatic transmission, wherein:

the second speed brake is so mounted as to apply pressure to a brake pressure plate and a brake disc brake reaction plate provided between transmission housing and a second speed brake hub connected to the reverse sun gear by way of a second speed brake piston protrusively arranged at a rear cover of the transmission housing;

the reverse clutch is mounted with a reverse clutch piston for applying pressure toward a clutch reaction plate to a clutch plate, a clutch disc provided between a reverse clutch hub connected to the reverse sun gear and a reverse clutch retainer connected to the input shaft;

the under drive clutch is mounted with an under drive clutch piston for applying pressure to a clutch disc, a clutch plate toward a clutch reaction plate provided between the reverse clutch piston and the under drive sun gear; and an under drive clutch return spring retainer is further connected to the input shaft and disposed with an under drive clutch return spring supporting the under drive clutch piston to guidingly advance the under drive clutch piston.

BRIEF DESCRIPTION OF THE DRAWINGS

For fuller understanding of the nature and objects of the invention, reference should be made to the following detailed description taken in conjunction with the accompanying drawings in which:

FIG. 5 is a schematic diagram for illustrating a frictional factor operating table per transmission of the power train according to the present invention;

DETAILED DESCRIPTION OF THE INVENTION

Construction and operation of the present invention will now be described in detail with reference to the accompanying drawings.

Figure 1:
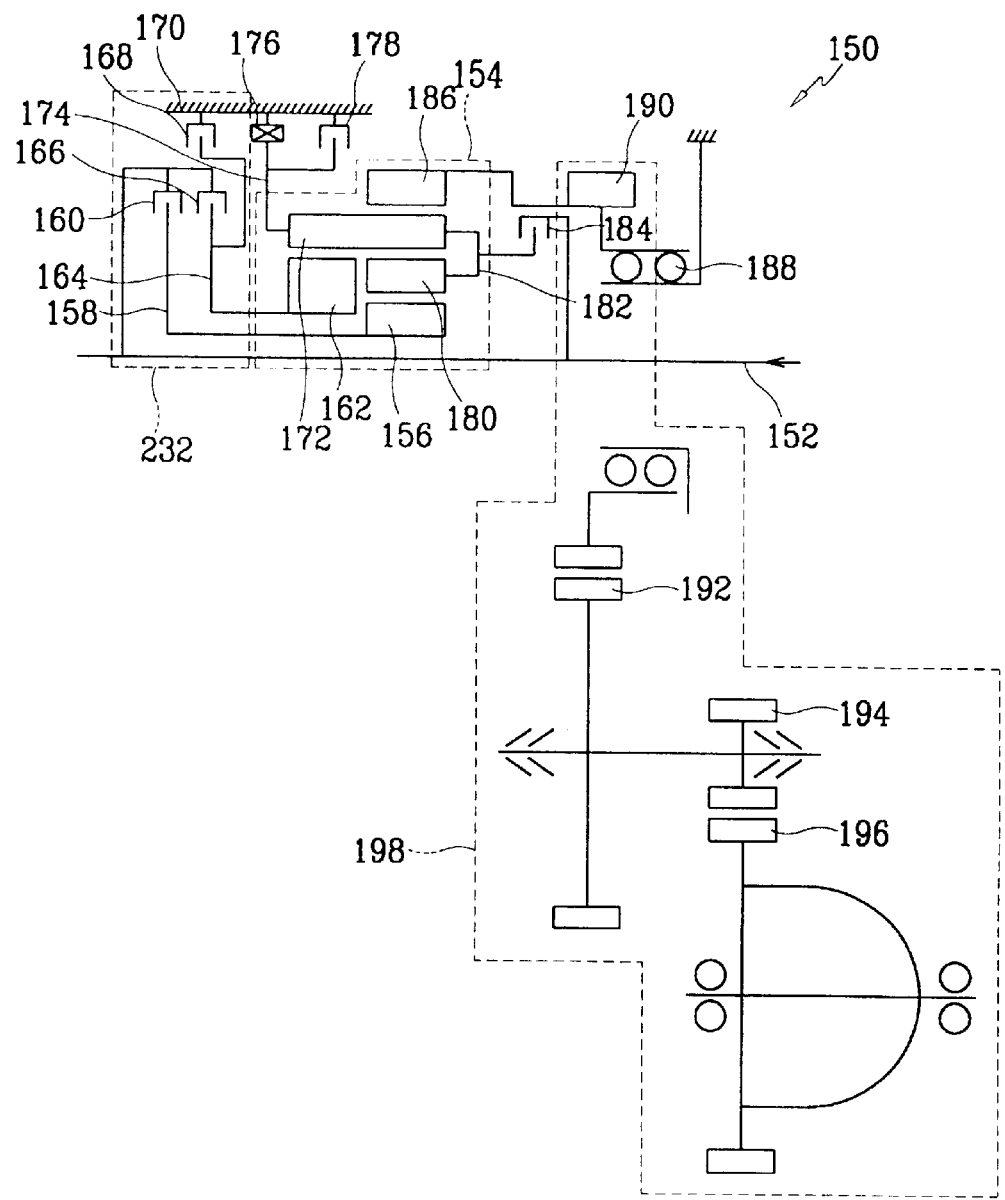
FIG. 1 is a block diagram for illustrating a power train of automatic transmission according to the present invention.
Figure 2:
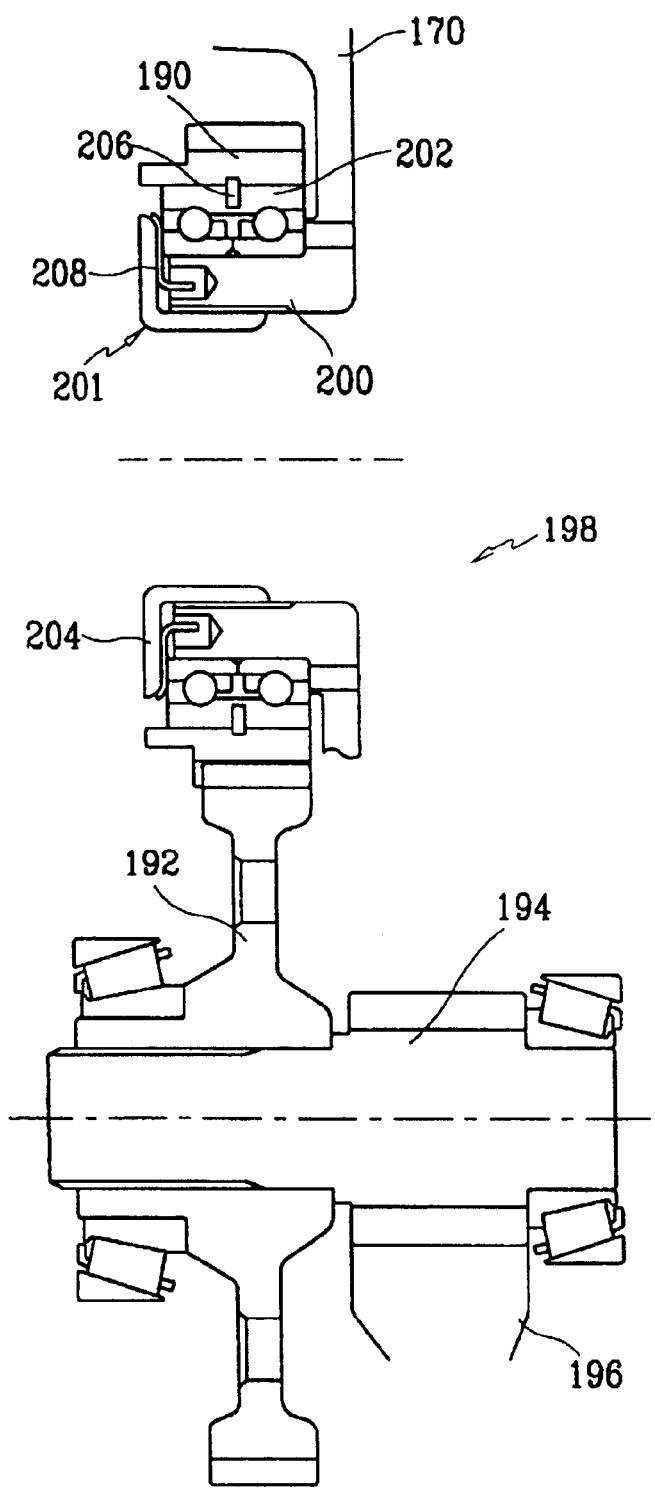
FIG. 2 is a schematic diagram for illustrating a final reduction gear unit according to the present invention.
Figure 3:
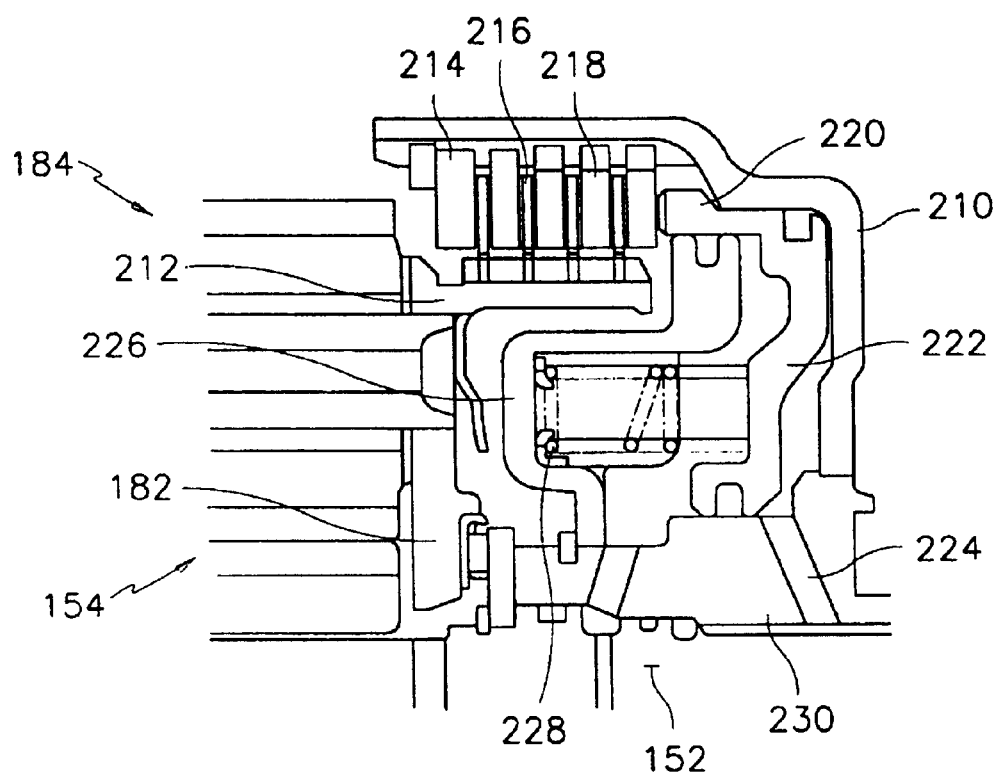
FIG. 3 is a schematic diagram for illustrating an over drive clutch unit of power train of automatic transmission according to the present invention.
Figure 4:
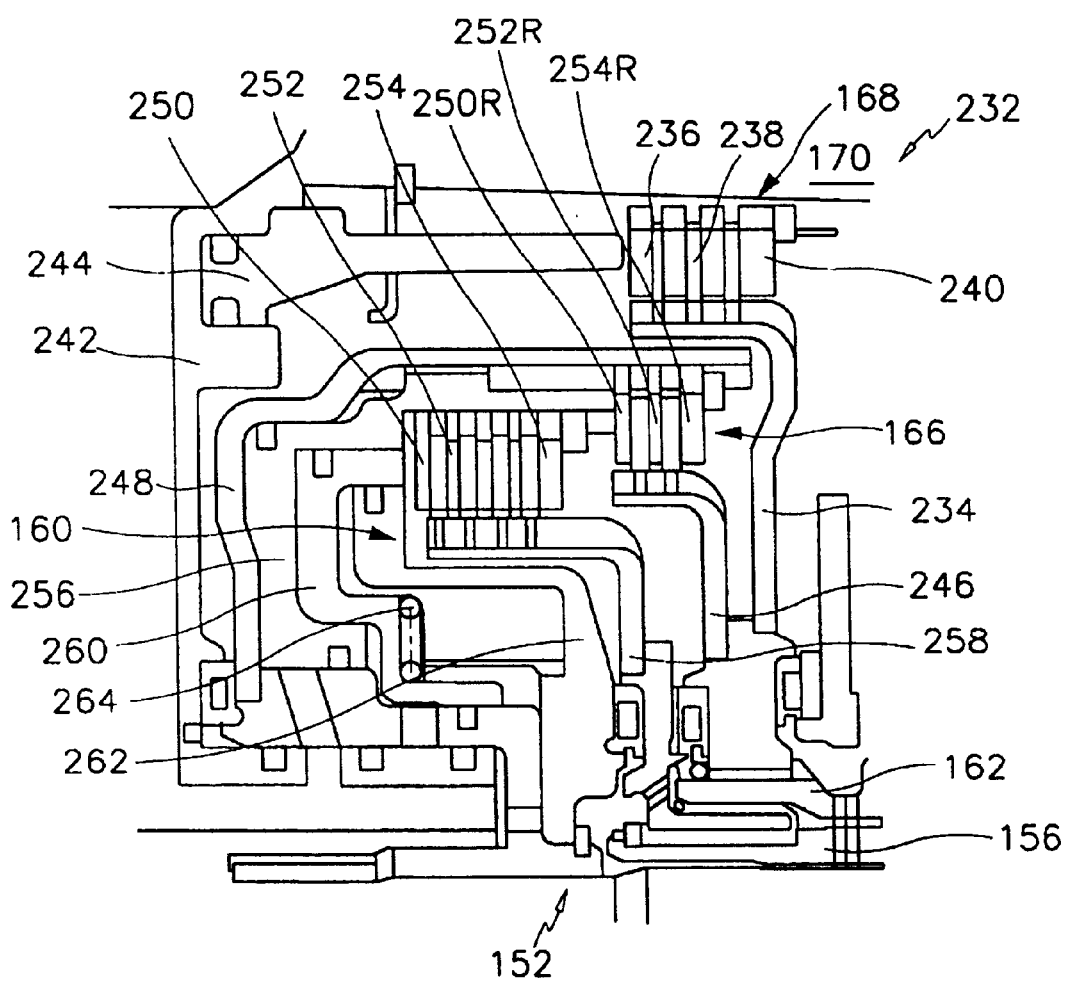
FIG. 4 a schematic diagram for illustrating an under drive clutch intermittent controller according to the present invention.
Figure 6:
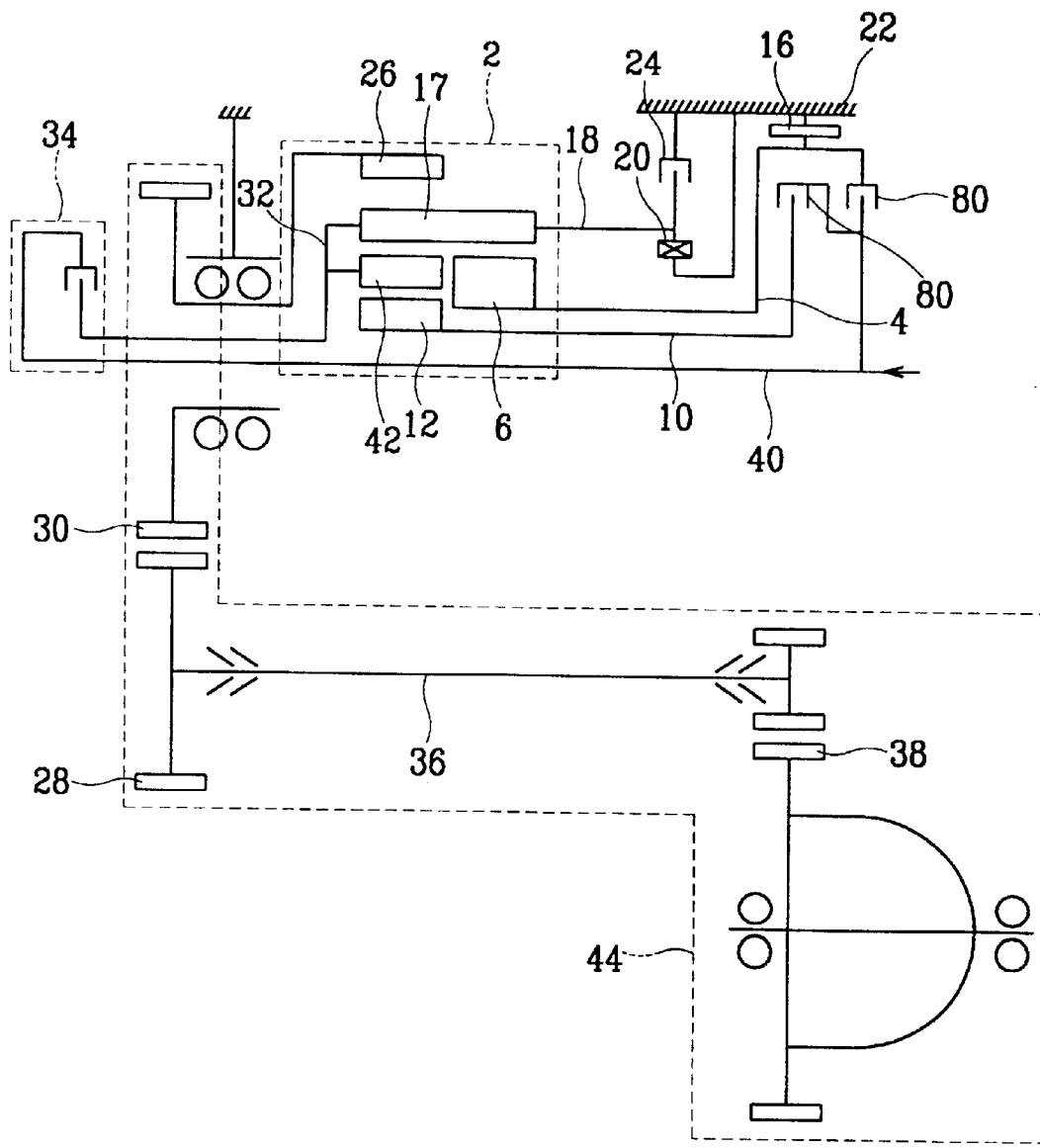
FIG. 6 is a block diagram of illustrating a power train according to the prior art.
Figure 7:
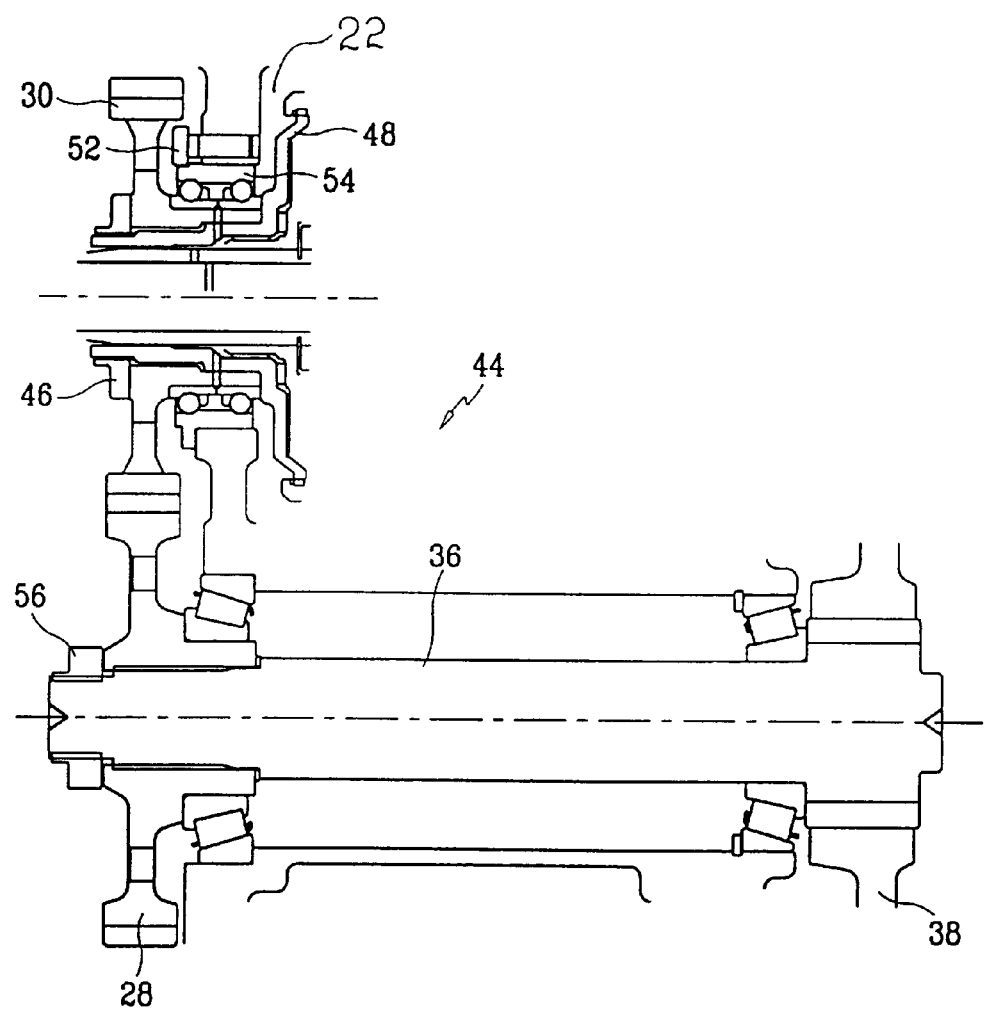
FIG. 7 is a schematic diagram for illustrating a final reduction gear unit of an automatic transmission according to the prior art.
Figure 8:
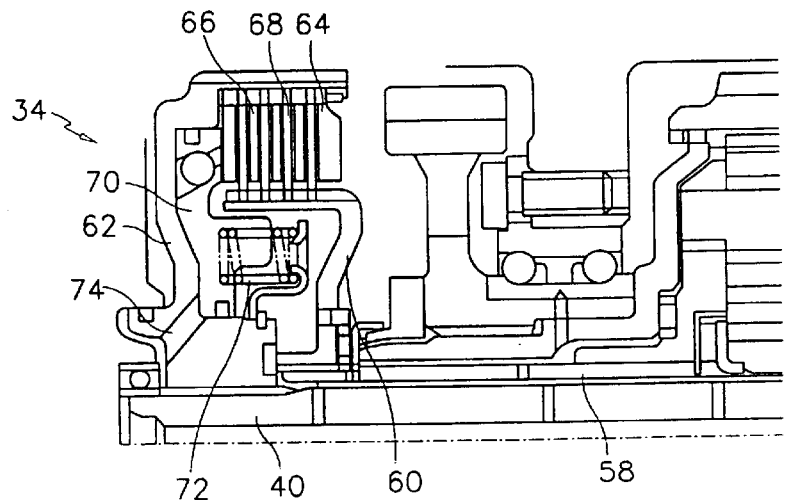
FIG. 8 is a schematic diagram for illustrating an end clutch unit according to the art.
Figure 9:
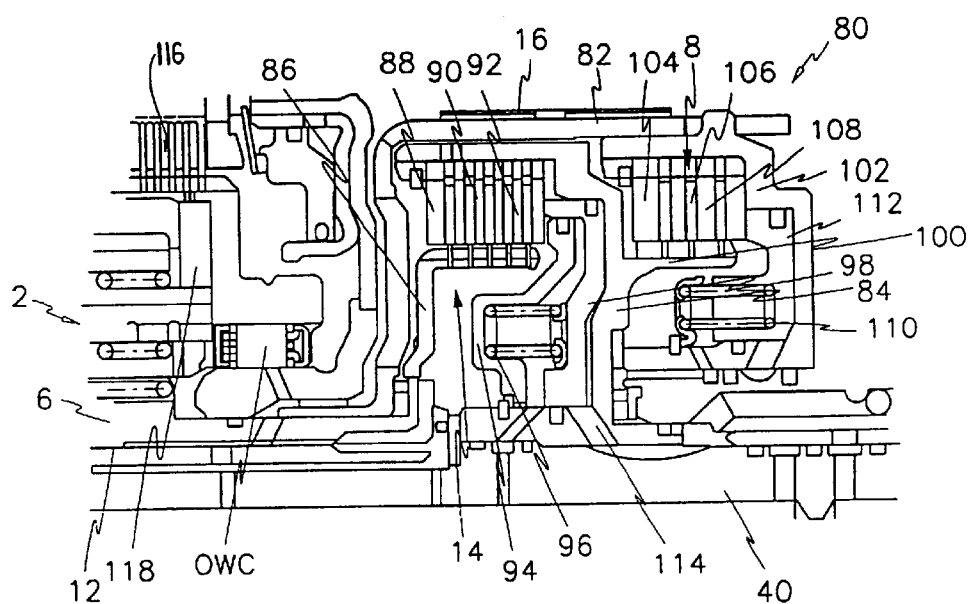
FIG. 9 is a schematic diagram for illustrating front and rear clutch intermittent controller according to the prior art.

FIG. 1 is a block diagram for illustrating a power train of automatic transmission according to the present invention, and FIG. 2 is a schematic diagram for illustrating a final reduction gear unit according to the present invention. FIG. 3 is a schematic diagram for illustrating an over drive clutch unit of power train for automatic transmission according to the present invention and FIG. 4 is a schematic diagram for illustrating an under drive clutch intermittent controller according to the present invention, while FIG. 5 is a schematic diagram for illustrating a frictional factor operating table per transmission of the power train according to the present invention.

The power train 150 of an automatic transmission is made by assembling a double pinion planetary gear set 154 disposed on an input shaft 152 rotating by receiving rotating power from an engine to embody advance 4 speeds and reverse 1 speed of speed shift.

An under drive clutch 160 is connected to a rear of under drive sun gear via a first power transmission member 158, and a reverse clutch connected to a rear of reverse sun gear 162 via a second power transmission member 164.

Furthermore, a second speed brake 168 is mounted at a transmission house 170 for restraining rotation of the second power transmission member 164. A one-way clutch 176 is connected to a rear of long pinion 172 of the double pinion planetary gear set 154 via a third power transmission member 174 and disposed at the transmission housing 170 for limiting the rotation, and a lower reverse brake 178 is branched from the third power transmission member 174 to be connected to the transmission housing 170.

An over drive clutch 184 is provided at a planetary carrier 182 arranged in front by connecting the long pinion 172 and short pinion 180 in order to be variably connected to an input shaft 152. A transfer drive gear 190 is connected to a front of annulus gear 186 of the planetary gear set 154 and has a bearing 188 at an inner circumference thereof. The transfer drive gear 190 is arranged in front, and a transfer driven gear 192 meshed thereto, a transfer shaft 194 and a deep drive gear 196 are interconnected.

A final reduction gear unit 198 is formed between the planetary gear set 154 and an oil pump (not shown) to form a tube portion 200 at the transmission housing 170 so that the input shaft 152 can pass therethrough.

A bearing member 202 is provided at a periphery of the tube portion 200 so as not to be detached by a locking nut 201 formed at the input shaft 152 which is an inner circumferential surface of the tube portion 200. The locking nut 201 forms a flange unit 204 to prevent the detachment of a bearing member 202. The bearing member 202 is secured at a periphery thereof with a transfer drive gear 190 via snap ring 206. Furthermore, the bearing member 202 is prevented from being detached by a stopper plate 208 assembled at the tube portion 200 to be positioned at the flange unit 204 of the locking nut 201. A transfer driven gear 192 is arranged to get meshed with the transfer drive gear 190 and to receive power therefrom. When the transfer driven gear 192 is mounted, the transfer shaft 194 is formed in shortened length, where the transfer shaft 194 transfers power to wheels through the deep drive gear 196.

An over drive clutch unit 184 at a power train of automatic transmission is mounted with an over drive clutch retainer 210 on the front input shaft 152 of the planetary gear set 154. An over drive clutch hub 212 is integrally formed with a planetary carrier 182 of the planetary gear set 154. An over drive clutch piston 222 is so mounted as to be guided an supported by a support plate 210 for advancing by oil pressure and pressing a clutch disc 216 and a clutch plate 218 arranged at one side of clutch reaction plate 214 provided between the over drive clutch retainer 210 and an over drive clutch hub 212.

When oil is supplied through an oil orifice 224 arranged at the over drive clutch retainer 210, the over drive clutch piston 222 copes with resilience of over drive clutch return spring 228 supported by over drive clutch return spring retainer 226 to be guided an advance, such that the over drive clutch piston 222 presses the clutch disc 216 and clutch plate 218 to provide power. Furthermore, the over drive clutch 184 integrates the over drive clutch hub 212 and end clutch shaft 230 with the planetary carrier 182 to thereby simplify the structure.

An under drive clutch intermittent controller 232 at the automatic transmission includes a second speed brake 162, a reverse clutch 166 and an under drive clutch 160.

The second speed brake 168 is so mounted as to apply pressure to brake pressure plate 236 and brake disc brake reaction plate 240 provided between transmission housing 170 and a second speed brake hub 234 connected to reverse sun gear 162 by way of a second speed brake piston 244 protrusively arranged at a rear cover 242 of the transmission housing 170.

A reverse clutch 166 is mounted with a reverse clutch piston 256 for applying pressure toward a clutch reaction plate 254R to a clutch plate 250R, a clutch disc 252R provided between a reverse clutch hub 246 connected to reverse sun gear 162 and reverse clutch retainer 248 connected to an input axle. An under drive clutch 160 is mounted with an under drive clutch piston 260 for applying pressure to clutch disc 252 and clutch plate 250 toward clutch reaction plate 254 provided between the reverse clutch piston 256 and an under drive clutch hub 258 connected to under drive sun gear 156.

An under drive clutch return spring retainer 262 is mounted for being connected to an input shaft 152 and disposed with an under drive clutch return spring 264 supporting the under drive clutch piston 260 to guidingly advance the under drive clutch piston 260.

Now, operation of the present invention thus constructed will be described.

When an oil pressure is actuated on the under drive clutch 160, the clutch plate 250, clutch reaction plate 254 and the clutch disc 252 are integrated by the under drive clutch piston 260 to enable power to be delivered to the under drive clutch hub 258.

Furthermore, when the oil pressure is simultaneously applied to the under drive clutch 160 and the reverse clutch 166, the clutch plates 250 and 250R, clutch reaction plates 254 and 254R and clutch discs 252 and 252R are integrated by the under drive clutch piston 260 to enable the power to be delivered to the under drive clutch hub 258 and the reverse clutch hub 246.

Furthermore, when the oil pressure is applied only to the reverse clutch 166, the clutch plate 250R, clutch reaction plate 254R and the clutch disc 252R are integrated by the reverse clutch piston 256 to enable the power to be transmitted to the reverse clutch hub 246.

In other words, the reverse clutch piston 256 and under drive clutch piston 260 are guidingly moved by the under drive clutch return spring retainer 262, to thereby promote a stability of control and to expedite the control because the second speed 168 is of disc type.

Furthermore, the under drive clutch 160 makes the reverse clutch piston 256 function as pistons for retainer cum reverse clutch, thereby simplifying the structure. Also, hubs of the under drive clutch and reverse clutch are welded for integrity.

Now, operation of the present invention thus constructed will be described.

<First speed>

The under drive clutch 160 as input element and one-way clutch 176 as repulsive element are actuated to perform a first speed. The power input to the input shaft 152 is transmitted to the under drive sun gear 156 via the under drive clutch 160, and is again transmitted to the transfer drive gear 190 via the short pinion 180, long pinion 172 and the annulus gear 186 with the planetary carrier 182 secured by the one-way clutch 176 working as repulsive element.

<Second speed>

The under drive clutch 160 as an input element and the second speed brake 168 as repulsive element are actuated to perform a second speed. The power input to the input shaft 152 is delivered to the under drive sun gear 156 via the under drive clutch 160 and is again transmitted to the transfer drive gear 190 via the short pinion 180, long pinion 172 and the annulus gear 186 with the reverse sun gear 162 secured by the second speed brake 168 acting as repulsive element.

<Third speed>

The under drive clutch 160 as input element and the over drive clutch 184 as repulsive element are actuated to allow the planetary gear set 154 to integrally rotate for performance of third speed. The power input to the input shaft 152 is simultaneously transmitted to the under drive clutch 160 and to the over drive clutch, and the power delivered to the under drive clutch 160 is transmitted to the under drive sun gear 156 and the power delivered to the over drive clutch 184 is transmitted to the reverse sun gear 162. At this point, the planetary gear set 154 is locked and integrally rotated where the power thereof is transmitted to the transfer drive gear 190.

<Fourth speed>

The over drive clutch 184 as input element and the second speed brake 168 as repulsive element are actuated to perform a fourth speed.

The power input to the input shaft 152 is transmitted to the planetary carrier 182 via the over drive clutch 184 and is again transmitted to the transfer drive gear 190 via the long pinion 172and the annulus gear 186 with the reverse sun gear 162 fixed by the second speed brake 168 as repulsive factor.

<Reverse>

The reverse clutch as input elements and the low reverse brake 178 as repulsive element are operated to perform a reverse speed. The power input to the input shaft 152 is transmitted to the reverse sun gear 162 through the reverse clutch 166, and is again transmitted to the transfer drive gear 190 via the long pinion 172 and the annulus gear 186 with the planetary carrier 182 secured by the low reverse brake 178. Of course, the speed in the transmission process thus described is determined by the number of teeth comprising the planetary gear set 154. Although rotating state thereof cannot be visibly seen, the state can be visibly seen by lever interpretation method. The lever interpretation method of power train is well known to the skilled person in the art, such that detailed description thereof will be omitted hereat.

In other words, when friction element provided at the front and rear of the planetary gear set is re-arranged, and the transfer drive gear is arranged in the front, structure of reverse and over drive clutch, second speed brake can be compacted.

As apparent from the foregoing, there is an advantage in the power train of automatic transmission according to the present invention thus descried in that a transfer drive gear is arranged before a planetary gear set and an under drive clutch, reverse clutch second speed brake, one-way clutch low reverse brake and the like are provided in the rear to compact the transmission, such that weight and cost can be reduced.

There is another advantage in that a bearing is assembled to a transfer drive gear by way of snap ring to eliminate bearing fixing bolt for reduction of the number of parts, such that assemblage and processibility are improved.

There is still another advantage in that a bearing is provided at an inner area of the transfer drive gear to simplify the structure.

There is further advantage in that the transfer shaft is shortened to thereby reduce the weight of the transmission, leading to cost reduction.

There is still further advantage in that over drive clutch hub and over drive clutch shaft are integrated with the planetary carrier to thereby reduce the number of parts and to thereby simplify the structure, leading to reduce weight and cost.

There is still further advantage in that processing method of retainer may be changed to improve processibility and strength.

There is still further advantage in that under drive clutch return spring retainer is applied and a second speed brake is applied in disc type to improve stability of control, such that simplified structure, improvement of assemblage along with reduction of weight and cost can be accomplished.

What is claimed is:

1. A power train of automatic transmission constructed and arranged to assemble a double pinion planetary gear set to an input shaft receiving a rotating power from engine for rotation to thereby embody a speed shift of four advance speeds and one reverse speed, the power train comprising:

an under drive clutch connected to a rear of under drive sun gear via a first power transmission member;

a reverse clutch connected to a rear of reverse sun gear via a second power transmission member;

a second speed brake mounted at a transmission housing for restraining rotation of the second power transmission member;

a one-way clutch connected to a rear of long pinion via a third power transmission member and disposed at the transmission housing;

an over drive clutch for variably connecting the input axle to a planetary carrier;

a tube portion extensively formed at the transmission housing between the planetary gear set and an oil pump to pierce the input shaft;

a bearing member assembled to a peripheral surface of the tube portion by a locking nut;

a transfer drive gear secured to the bearing member by a snap ring;

a transfer driven gear mounted by a snap ring in order to receive power by being meshed with the transfer drive gear; and a transfer shaft for mounting the transfer driven gear and for arranging a deep drive gear at one side thereof in short length to transfer power.

2. The power train as defined in claim 1, wherein the locking nut is arranged between an inner circumferential surface of the tube portion and the input shaft to form a flange unit for prevention of the bearing member.

3. The power train as defined in claim 1, wherein a stopper plate is mounted between the locking nut and the bearing member at the tube portion to prevent detachment of the bearing member double-fold.

4. The power train as defined in claim 1 further comprising:

an over drive clutch retainer mounted on the input shaft in front of the planetary gear set;

an over drive clutch hub integrally formed at the planetary carrier; and an over drive clutch piston so mounted as to be guided and supported by a support plate for advancing and pressing by oil pressure a clutch disc and a clutch plate arranged at one side of a clutch reaction plate provided between the over drive clutch retainer and an end clutch hub.

5. The power train as defined in claim 1, wherein:

the second speed brake is so mounted as to apply pressure to a brake pressure plate and a brake disc brake reaction plate provided between transmission housing and a second speed brake hub connected to the reverse sun gear by way of a second speed brake piston protrusively arranged at a rear cover of the transmission housing;

the reverse clutch is mounted with a reverse clutch piston for applying pressure toward a clutch reaction plate to a clutch plate, a clutch disc provided between a reverse clutch hub connected to the reverse sun gear and a reverse clutch retainer connected to the input shaft;

the under drive clutch is mounted with an under drive clutch piston for applying pressure to a clutch disc, a clutch plate toward a clutch reaction plate provided between the reverse clutch piston and the under drive sun gear; and an under drive clutch return spring retainer is further connected to the input shaft and disposed with an under drive clutch return spring supporting the under drive clutch piston to guidingly advance the under drive clutch piston.

6. The power train as defined in claim 5, wherein the reverse clutch piston is movably splined to an inner side of the reverse clutch retainer to actuate the reverse clutch.

7. The power train as defined in claim 5 wherein the reverse clutch piston is so mounted as to actuate a retainer at the under drive clutch.

* * * * *